INVENTORS
EARL V. WAGONER, JR.
BY THOMAS L. ROBERTSON

United States Patent Office 3,524,058
Patented Aug. 11, 1970

3,524,058
RESPIRATION MONITOR HAVING MEANS FOR
TRIGGERING A UTILIZATION DEVICE
Thomas L. Robertson, San Gabriel, and Earl V. Wagoner,
Jr., San Pedro, Calif., assignors to North American
Rockwell Corporation, a corporation of Delaware
Filed Aug. 1, 1966, Ser. No. 569,191
Int. Cl. G03b 41/16
U.S. Cl. 250—65     13 Claims

ABSTRACT OF THE DISCLOSURE

This invention relates to a sensing device; and more particularly to a sensing device that detects selected changes in the body of a living animal. The range of change is shown on a display-device; and an operator can select a given level of change that is desired to produce a suitable trigger-signal. The trigger-signal may then be applied to a utilization device, such as an X-ray machine, which thereupon takes an X-ray picture of the body at the selected instant.

BACKGROUND

In the medical field, it is frequently desirable to "monitor" various activities that are going on in the body of a patient; these activities being breathing, heart beats, muscle contractions, blood pulsations, and the like. Generally, a human observer looks for, times, and records these activities; but this procedure is time consuming and inefficient, and automatic devices are desirable. Therefore, many sensors have been devised; these generally using switches, compressible fluids, and the like to detect surface indications associated with the specific body activities. Many sensors have been developed to monitor breathing (respiration) since this condition is most frequently monitored.

Traditionally, respiration has been recorded by the use of pneumographs, pneumotachographs, spirometers, strain gauges, negative pressure transducers, and crystal thermistor sensors. Difficulties encountered with pneumographs include leaks in the air systems and slippage on the body, along with problems of locating a level where the maximum chest or abdominal expansion occurs. Pneumotachographs and spirometers are excellent quantitative instruments which indicate the air velocity and volume, but these—and crystal thermistor sensors—all require connection to airways by means of face masks, mouth- or nose-pieces. Recording intratracheal or intrapleural pressures with negative pressure transducers is only practical in laboratory animals or with anesthesia.

It has been found that many internal activities of the body, in addition to producing surface indications, cause the body to change its electrical characteristics; and a series of electrical devices have been developed for measuring the changed electrical properties of the body. These devices usually comprise body-electrodes that are attached to or below the surface of the skin; and an electric current is directed through the electrodes and the body— the internal activities of the body "modulating" the electric current flow. The modulations are then used to produce an output signal waveform that corresponds to the internal activities of the body. In the past, the output signal waveform has been displayed on a viewing device similar to a television set; so that an observer could see the resultant waveform. Frequently, the displayed waveform is also recorded for future study or reference. The display of breathing-cycle and heart-beat waveforms is discussed—among other places—in U.S. Pat. 3,212,496; and in "The Impedance Pneumograph"—Geddes et al., Aerospace Medicine, January 1962, pages 28–33. In these cases the waveforms themselves are displayed and studied.

As is well known, it is sometimes desirable to take an X-ray picture when the lungs are fully inflated—in order to study the lungs. At other times, it is desirable to take the X-ray picture when the lungs are fully deflated—in order to study the surrounding area. Thus, the operator usually instructs the subject to inhale or to exhale; and to maintain that condition for an instant, during which the X-ray picture is taken.

An unusual medical problem arises when a child must have its chest X-rayed, since children tend to be quite restless; and younger children, in particular, do not understand the instruction to fully inhale or to exhale, and then maintain this condition. Under some conditions, the child may be incapable of responding to this instruction. It has therefore been necessary to take a series of X-ray pictures, hoping that some of the X-ray pictures occur at the desired lung-inflated or lung-deflated condition. However, the repeated exposure to X-rays is quite objectionable; and prior art sensors, particularly masks and nasal insertions, have not been satisfactory—as they disturb the child, and create abnormal conditions.

OBJECTS AND DRAWINGS

It is therefore an object of the invention to provide an improved sensing device for detecting internal activities of a living body.

It is another object of the invention to detect particular points of the breathing cycle, so that an X-ray picture of a child's lungs may be taken at specific points in the respiration cycle.

It is another object of the invention to provide a visual breathing cycle display with visual controls that may be adjusted to automatically trigger the X-ray picture at one or both of selected inhalation or exhalation peaks.

The attainment of these objects, and others, will be realized from the teachings of the present specification— taken in conjunction with the drawings, of which FIG. 1 is a schematic drawing of a circuit for practicing the invention;

SYNOPSIS

Figure 1:
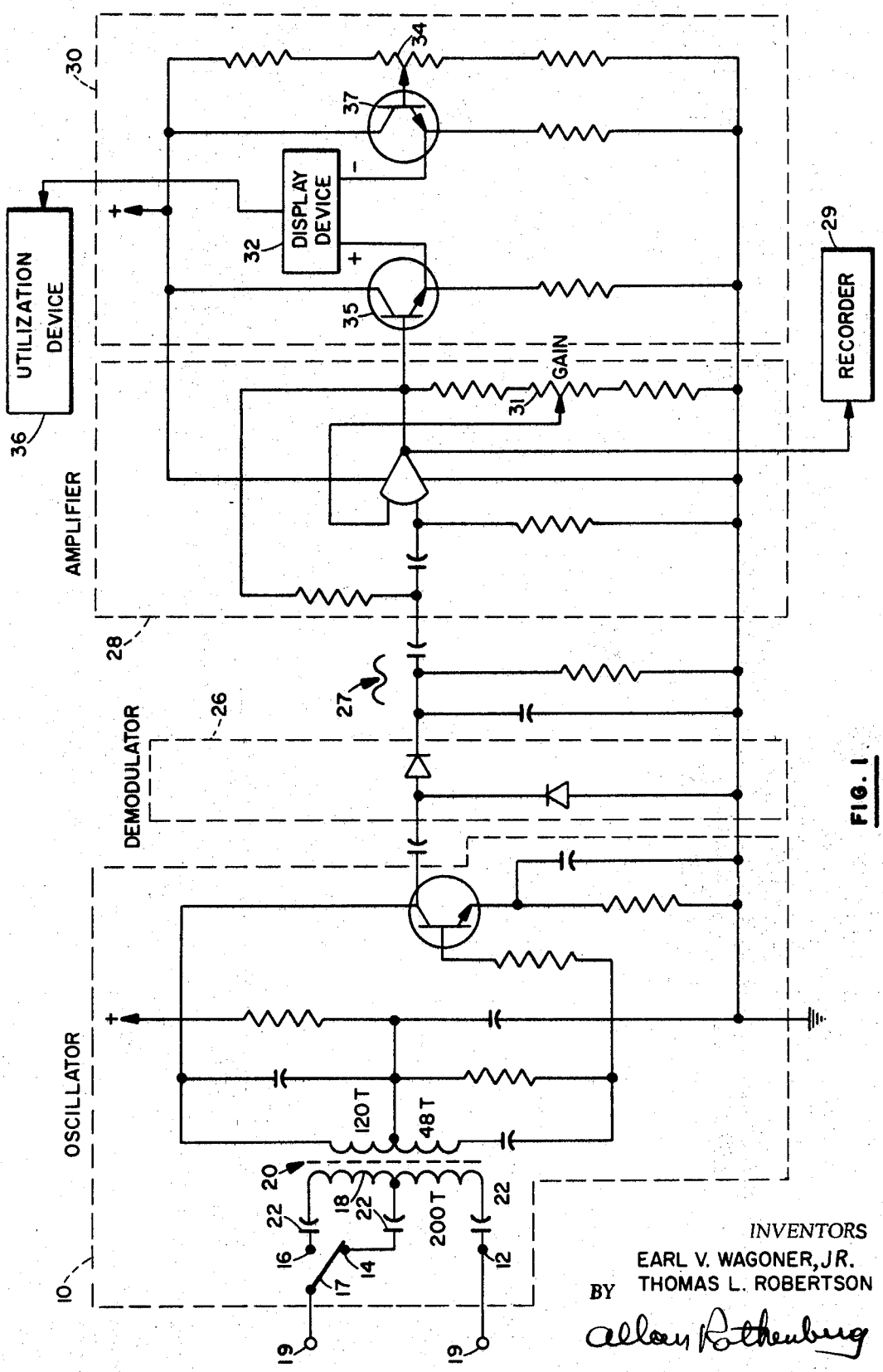

Broadly speaking, the present invention uses body electrodes to direct an electric current through a particular portion of the patient's body; the type of electric current being selected in order to be optimumly modulated by the changes that are to be studied. The modulations produce an output waveform that is applied to a visual indicator device, whereby the visual indicator permits the operator to observe the frequency and magnitude of the changes— which, if desired, may also be recorded. The operator uses the indicator device to set the point at which the output waveform produces a trigger-signal, so that a utilization device—such as an X-ray machine—is triggered at the optimal instant.

INTRODUCTION

It is well known that an electric current can be sent through the human body by means of electrodes that are affixed to the patient's skin. It is also known that the skin has a high electrical resistance, so that internal changes tend to be masked by the high skin-resistance. It has further been found that the internal activities of the body, particularly those involving a change of local volume of air or blood, cause that area of the patient's body to change its electrical impedance.

Stated in another way, when the patient's lungs are empty, they have a different electrical impedance than when they are full of air. Similarly, when electrodes are fastened near the temples, the pulsations of blood in that area produce a varying electrical impedance. In a similar manner, uterine contractions also change the amount of blood in that area, and this causes a change of electrical impedance. These changes of electrical impedance are particularly effective in modulating an electric current of a particular frequency.

Therefore, the present invention produces an electrical current of the optimal frequency to be affected by the changed impedance of these internal activities of the body. In this way the resultant current is modulated, and may be demodulated to produce an output waveform that corresponds to the internal activities of the human body.

It was originally believed that electrical signals having a frequency of 20,000 cycles per second were optimum; but further investigation proved that this was not the case. It was determined experimentally that layers of fatty tissue in the area where the electrodes were attached tend to limit the electric current entering the body. This limitation was quite marked for the 20,000 cycle-per-second current; but, for a current having a frequency of between 50,000 cycles-per-second, and 100,000 cycles-per-second the fatty layers had a minimal effect. Therefore, by using a 100,000 cycle-per-second electrical current, the arrangement worked in an optimal manner for all types of body structure; and for children as well as adults. As discussed above, this electric current is modulated by the body's internal activities, such as the breathing cycle. Therefore, the demodulated output waveform corresponds to the breathing cycle; and by causing the output waveform to produce a visual indication corresponding to the breathing cycle, an operator can determine at which point the lungs are full, and at which point the lungs are empty.

In accordance with a significant feature of the invention, as a child breathes in his own particular manner, the combined control and visual indication permits the operator to see—on the visual indicator—the times at which the lungs are at maximum expansion or contraction; even though they are not as fully expanded or contracted as if the child had deliberately inhaled or exhaled to the greatest possible extent. The invention permits the operator to then set the equipment to produce a trigger-signal at the optimal point of the breathing-cycle. Certain display devices, to be described later, inherently contain equipment that automatically produces trigger-signals at a desired setting.

Thus, as soon as the child inhales—or exhales—to the predetermined extent, the X-ray machine (which has been suitably pre-set) is triggered to take an X-ary picture at that instant. In this way, the disclosed invention permits a single picture to be taken at the desired instant; rather than taking a series of pictures, and hoping that one of them will happen to be taken at the correct instant.

DESCRIPTION OF THE INVENTION

The operation of the invention may be understood from FIG. 1. Here an oscillator 10—such as a series-fed, constant-current Hartley oscillator—produces an oscillating electrical signal (typically 100,000 cycles per second).

As discussed above, a pair of body electrodes, such as electrodes Model 130, manufactured by Space Labs, Inc., Van Nuys, Calif., are preferably applied to opposite sides of the chest cavity, in the area of rib #7, in the midclavicular line. The body to which the electrodes are attached provides an electrical impedance to the electric current; and, as the subject breathes, the resultant varying impedance of the respiratory cavity appears as a changing load across the secondary winding 18 of transformer 20. The operation of oscillator 10 thus depends upon the impedance sensed by the impedance-sensing body-electrodes.

It has been found that the winding-ratio of transformer 20 controls the impedance-range within which the oscillator operation is optimum. For example, a primary-winding to secondary-winding turns-ratio of 120:350 is optimum of obese adults; whereas a ratio of 120:100 is optimum for children. Therefore, an intermediate turns-ratio of 120:200 was chosen; as this provided the optimum oscillator operation for the respiratory-cavity impedance of most subjects.

Moreover, secondary-winding 18 has a first-end-tap 12, an intermediate-tap 14, and a second-end-tap 16. An "adult-child" selector switch 17 interconnects the desired taps to provide about 1.0 volt for adults, and about 0.6 volt for children. Thus, the operation of oscillator 10 is modulated by the changing electrical impedance occurring across the chest cavity during the breathing cycle. A high-gain oscillator is used, so that it will continue to operate even when the shunting impedance of the body approaches zero; if a high-gain oscillator were not used, individual secondary taps would be required to match each load to the oscillator. With a low-gain oscillator, low impedance loads would overload the secondary winding, and prevent the oscillator from operating. Isolating capacitors 22 are used to prevent ECG signals generated in the body from finding their way into the circuitry.

As the body changes its electrical impedance, the changes affect the amplitude and frequency of the signal produced by the oscillator; and the changing oscillator output-signal is applied to demodulator 26, which converts the amplitude changes to an output signal waveform 27. Demodulator 26 may take any convenient form, the illustration showing a pair of diodes connected in such a manner that the output signal is a DC signal that varies in accordance with the change of impedance of the subject; i.e., with the breathing-cycle.

Figure 2:
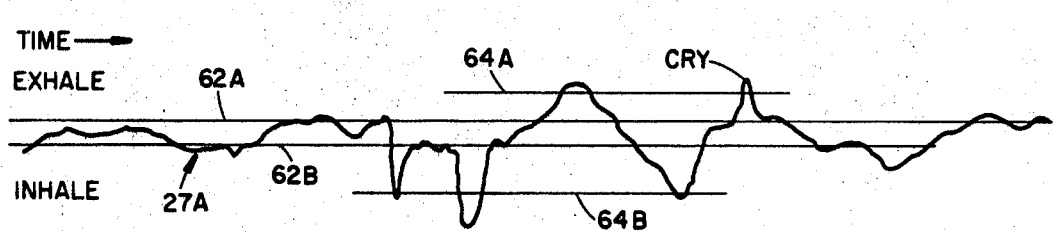
FIG. 2 shows a child's breathing cycle.

The output waveform-signal 27 from demodulator 26 may be applied to a recorder 29; and FIG. 2 shows a typical waveform 27A exemplifying a child's breathing-cycle. Referring back to FIG. 1, the output-waveform-signal 27 is amplified by amplifier 28, which may take any suitable form—a satisfactory amplifier being Operational Amplifier Model 1517, manufactured by Burr-Brown of Tucson, Ariz.

The output signal of amplifier 28 is applied to a trigger-signal-producing arrangement 30, which may also take a number of forms; one of the simplest, most compact, and most satisfactory from the standpoint of the radiologist, being a meter 32 having an indicating needle capable of swinging across a graduated scale. Gain control 31 adjusts the excursions of the indicating needle. In use, or by circuit design, the meter is biased (as by potentiometer 34) so that the indicating needle is normally at a central position; transistors 35 and 37 forming an adjustable bridge circuit for the meter. When waveform 27 is applied to the meter, the indicating needle swings from side to side at a frequency and with an amplitude depending upon the breathing-cycle waveform. Preferably, the meter has two manually-positionable needles ("markers" or "cursors") the adjustable location of these cursors being designated as "trigger-points"; and when the indicating needle (driven-marker) attains the location of these trigger-points, a trigger signal is produced—and is applied to a utilization device 30. Many such indicating meters are available, examples of these being Meter Model 503, made by the A.P.I. Instrument Company of Chesterland, Ohio; and Meter Model 3324, made by Simpson Electric Company of Chicago. It should be noted that the disclosed embodiment does not produce a prior-art waveform display; but rather produces a visual indication of the inhalation and exhalation peaks.

Figure 3:
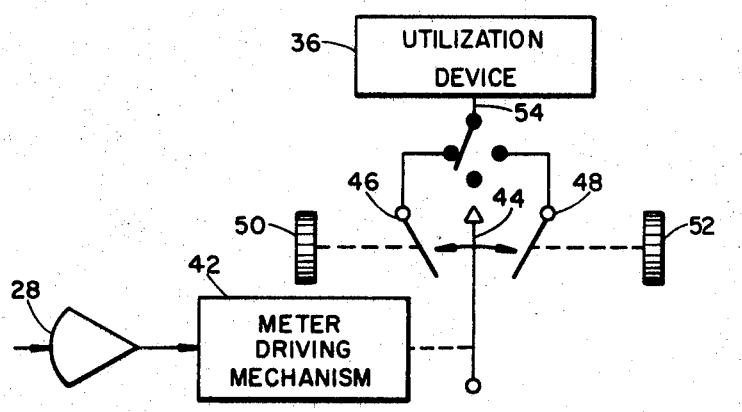
FIG. 3 is a schematic representation of a portion of the circuit.

As shown schematically in FIG. 3, the output-signal from operational amplifier 28 is applied to the meter's driving-mechanism 42, thus causing the indicating-needle 44 (driven-marker) to oscillate across the meter's scale in such a way that the driven marker's instantaneous position corresponds with the instantaneous condition of the breathing-cycle. Independently-positionable cursors 46 and 48, are positionable by means such as knobs 50 and 52; and are moved to desired trigger-points. When the driven marker 44 attains the location of a cursor 46 or 48, a trigger-signal is produced; and an output switch 54 permits the desired trigger-signal to be applied to utilization device 36. Preferably, the trigger-signals are applied to relays, that in turn activate the utilization device; in this way obviating the possibility of utilizing-device voltages being applied to the circuitry or the subject.

Figure 4:
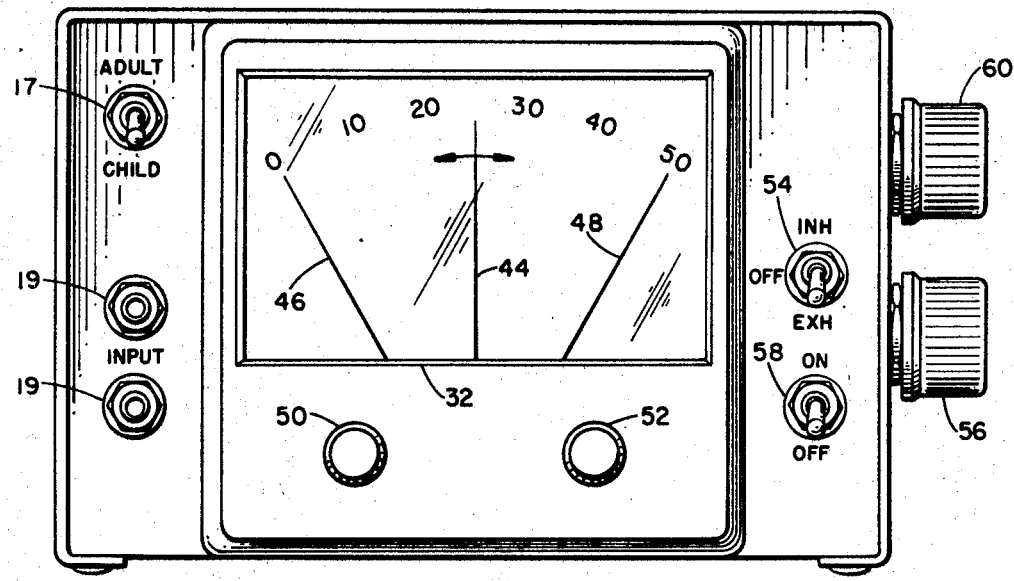
FIG. 4 is a representation of a control panel.

Attention is now directed to FIG. 4, which illustrates a control panel comprising the meter visual-indicator. In use, output switch 54 is set to its OFF position; and the needle-positioning potentiometer (34 of FIG. 1) is adjusted by means such as a knob 56 to center the indicating needle (driven marker) 44. The adult-child selector switch 17 is suitably set; the body-electrodes are plugged into input terminals 19; and the power switch 58 is turned on. In accordance with the previous explanation, the breathing-cycle waveform 27 now causes the driven marker 44 to oscillate across the scale of the meter.

Assume, for convenience of explanation, that inhalation causes driven marker 44 to swing to the right, and that exhalation causes driven marker 44 to swing to the left. The operator observes the excursions of driven marker 44, realizing that its extreme limits correspond to inhalation peaks and exhalation peaks of waveform 27. He then adjusts the gain, by means of knob 60, so that the needle excursions are suitable. Once the peaks occur in a satisfactory portion of the scale, the exhalation cursor 46 and/or the inhalation cursor 48 are independently positioned by means of knobs 50 and 52; the positioning of these cursors establishing the previously-discussed inhalation and exhalation trigger-points. When the movement of the driven-marker attains the position of a preset cursor, a trigger-signal is produced—the above-identified meters producing the trigger-signals by optical means.

Referring back to FIG. 2, waveform 27A shows that the child's breathing-cycle produces a more-or-less regular waveform; and that cursor settings corresponding to levels 62A and 62B would ordinarily produce the desired X-ray pictures. However, if more extreme lung-inflation and deflation conditions are desired, the cursors may be set to correspond to levels 64A and 64B—produced by crying.

It should be noted that the cursors are set to suitable positions that are then compared with the driven-marker excursions produced by the inhalation-peaks and exhalation-peaks. If the comparison is unsatisfactory, the cursors are repositioned.

If the operator desires only an inhalation-trigger-signal, output switch 54 is set to its inhalation position; whereas if he desires an exhalation-trigger-signal, output switch 54 is set to its exhalation position. Alternatively, the unwanted trigger signal may be obviated by setting its cursor so far off-scale that the driven marker never reaches it. Under some conditions both an inhalation and an exhalation X-ray picture are desired. To achieve this, an X-ray film changer is used, and the operator resets output-switch 54 as soon as one X-ray picture has been taken.

In summary, as the waveform is applied to meter 32, the indicating needle swings back and forth until it reaches the preselected trigger-point. A this time, the meter produces a trigger-signal, which is applied to utilization device 36, which may be the X-ray machine previously discussed. In this way, as the subject breathes, his breathing cycle excursions are noted on display device 32, and the suitably-positioned trigger-point produces a trigger-signal at either optimal inspiration or expiration; the trigger-signal triggering the X-ray machine to take an X-ray picture of the subject at the desired instant.

It is interesting to note that it is frequently necessary to X-ray a child that is belly-breathing, crying, gasping, or moving. Since the disclosed device permits the attendant to preset the trigger-points, the disclosed device has produced clear useful X-ray pictures—even under these conditions.

In clinical operation of an embodiment of this invention, it has been found that the first X-ray picture taken is invariably the desired one; whereas in prior systems, the hit-or-miss arrangement generally required as many as six X-ray pictures before a satisfactory X-ray picture was produced. Thus, the disclosed device minimizes the X-ray exposure of the patient and attending nurses; and thus safeguards both the subject and attendants.

It was previously pointed out that uterine contractions also changed the body's electrical impedance. For this usage, the electrodes are attached to the body in the lower abdominal area; and the output-signal waveform is then applied to a utilization device such as a quantizer and counter. The quantizer indicates the magnitude of contractions, and the counter (rate-of-occurrence indicator) indicates their rate. In this way, an attendant knows the instantaneous state of the subject.

It has been found that various readings, such as cranial scanning for tumors, are modified by the breathing cycle. Moreover, it is known that during the normal breathing cycle, a person holds his breath momentarily at full lung inflation and at full lung deflation. For this usage, the trigger-signal is set to occur during the breath-holding instant, so that the desired reading is obtained without modification by the breathing-cycle.

This function can be achieved electronically by replacing trigger-signal-producing device 32 with an electronic circuit that senses when the output signal waveform reaches a maximum and/or a minimum. Various such circuits are available, one of these being known as a "delta encoder," which is described in "Single-Bit Delta Modulating System"—Lender & Kozuch, Electronics data Nov. 17, 1961. This circuit produces a signal of a given polarity when the input is increasing, and produces a signal of the opposite polarity when the input is decreasing. Thus, the signal from the delta encoder circuit changes polarity at the maximum inhalation point and at the maximum exhalation point of the breathing-cycle. A polarity-sensing circuit detects the polarity change, and produces a trigger-signal. In this way, an electronic circuit triggers the utilization device at the optimal instant.

Of course, the instant invention may be designed to operate on battery power—and thus be portable; or it may be designed to operate from the same power source that operates the utilization device. A portable unit—operated by a plug battery—weighed ninety grams, and had an overall size of 2" x 1¾" x ⅝".

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. The combination for detecting selected internal electrical changes in the body of a living animal, comprising:
   a set of electrodes attachable to said body adjacent the areas undergoing said internal electrical changes;
   means for applying electric power to said electrodes for causing the electric-current flowing through said body between said electrodes to be modulated by said internal electrical changes of said body;
   means for converting said modulations to an output-signal;
   means, comprising a display-device, for continuously displaying said internal electrical changes;
   means for continuously applying said output-signal to said display-device;
   means, associated with said display, for establishing the point of said display at which a trigger-signal is to be produced; and means for applying said trigger-signal to a utilization device.

2. The combination of claim 1 wherein said utilization device is an X-ray machine; and
means for causing the display-controlled trigger-signal to trigger said utilization-device.

3. The combination of claim 1 wherein said utilization device is a rate-of-occurrence indicator.

4. The combination comprising:
means, responsive to electrical impedance variation of the chest cavity of a subject, for producing an output waveform coresponding to the breathing cycle of the subject;
means for producing a trigger-signal at a given point of said breathing-cycle, said trigger-signal-producing means comprising means for displaying the variation of said breathing-cycle and means—associated with said display means—for establishing a given point of said breathing-cycle at which said trigger-signal is produced.

5. The combination of claim 4 wherein: said trigger-signal-producing means is a trigger-signal-producing meter.

6. The combination of claim 5 wherein said meter comprises:
means for providing a visual indication of the output waveform;
means for positioning at least one adjustable cursor for comparison with the visually-indicated waveform; and
means for producing said trigger-signal, adapted to trigger an X-ray device, when said visually-indicated waveform attains a trigger-point selected by the position of said cursor.

7. The combination of claim 5 wherein said meter comprises:
means for providing a visual indication of the output waveform;
means for positioning a pair of independently adjustable cursors for comparison with the visually-indicated waveform; and
means for producing said trigger-signal, adapted to trigger an X-ray device, when said visually-indicated waveform attains a trigger point selected by the position of one of said cursors.

8. An apparatus for triggering an X-ray machine comprising;
means for generating a visual indication of the breathing cycle of a subject, said visual indication including peaks of inhalation and peaks of exhalation;
a first visual cursor;
means for adjustably setting said visual cursor at a selected position with respect to said peaks; and
means for generating an X-ray trigger signal when a peak attains a predetermined relation to the preset cursor.

9. The structure of claim 8 wherein said means for providing a visual indication of the breathing-cycle comprises:
a high-frequency wide-input-impedance-range oscillator including
an impedance-range controlling transformer having a secondary winding, said secondary winding having a first-end tap, an intermediate tap, and a second-end tap;
a pair of respiratory-cavity impedance-sensing body electrodes adapted to contact a subject on opposite sides of the subject chest cavity, one of said electrodes being connected to one of said end-taps of the second winding; and
means for selectively coupling the other body-electrode to one of the other taps of the secondary winding.

10. The apparatus of claim 9 including:
a second visual cursor;
means for adjustably setting said first cursor at a selected position with respect to said exhalation peaks;
means for adjustably setting said second visual cursor, independently of said first cursor, at a selected position with respect to said inhalation peaks;
a driven-marker;
means for generating a first X-ray trigger-signal when an exhalation causes said driven-marker to attain a predetermined relation to the preset exhalation-cursor; and
means for generating a second X-ray trigger-signal when an inhalation peak causes said driven-marker to attain a predetermined relation to the preset inhalation-cursor.

11. The apparatus of claim 10 wherein said means for providing a visual indication comprises:
a demodulator, responsive to the oscillator output-signal, for providing a waveform having an instantaneous magnitude that fluctuates in accordance with the breathing cycle of the subject;
amplifier means, responsive to the demodulator output-signal, for amplifying said waveform signal;
means, responsive to the amplifier output-signal, for causing the driven-marker to oscillate along the scale in accordance with breathing cycle of the subject; and
means for controlling the application of said trigger-signal to said X-ray machine.

12. Apparatus for monitoring the breathing cycle of a subject, and for triggering an X-ray machine at a selected point of the breathing cycle, comprising:
a high-gain wide-input-impedance-range constant-current oscillator comprising a transistor having collector, emitter, and base electrodes, a parallel resistance-capitance circuit connecting the emitter electrode to ground, a first inductor having one end connected to the collector electrode, and having a series resistance circuit connecting the other end of the inductor to the base electrode, a first capacitor connected between the collector electrode and an intermediate point of the inductor, a first resistor connected between said intermediate point and ground, a second resistor connected between the intermediate point and a source of supply;
a second inductor; a second capacitor connected at one end thereof, a third capacitor connected to the other end thereof, and a fourth capacitor connected to an intermediate point thereof, the turns ratio of the first inductor to the second inductor being in the range of from one-to-two to one-to-four,
first and second output terminals having first and second body-electrodes connected thereto and adapted to be connected to a subject for detecting impedance variation in the chest cavity of the subject, said first body-electrode being connected to the second capacitor, said second body-electrode and output terminal being alternatively switch-connected to either the third or fourth capacitors,
a demodulator capacitatively coupled to the transistor collector, and including a first diode connected between ground and the demodulator input, and a second diode connected between the demodulator input and the demodulator output,
an operational amplifier capacitatively coupled to the demodulator output,
an adjustable display device including an adjustable bridge circuit comprising second and third transistors each having a collector connected to the voltage supply source and having an emitter resistively connected to ground, the base of the second transistor being connected to the operational amplifier output, a voltage divider connected between the voltage supply source and ground, and having an adjustable tap connected with the base of the third transistor, a display meter having a driven display marker and a driver therefor connected between the emitter of the second and third transistors, said meter including first and second manually adjustable and visual trigger point markers for generating a trigger-signal when the driven marker is driven into coincidence with one or the other of the adjustable markers, and a meter output terminal for providing X-ray triggering-signals, and a switch for connecting the meter terminal to receive the trigger-signal generated upon coincidence of the driven marker with one or the other of the adjustable markers.

13. The method of taking an X-ray picture of a subject having a given breathing-pattern, comprising the steps of:

forming a visual indication of the breathing-cycle of said subject, including peaks;

positioning a pair of cursors at locations corresponding to selected trigger points of the visual indication for visual comparison with the peaks of said breathing cycle; and generating an X-ray machine triggering-signal when a breathing cycle attains a trigger point location of one of the cursors.

References Cited

UNITED STATES PATENTS

| | | | |
|---|---|---|---|
| 3,129,704 | 4/1964 | Burt. | |
| 3,347,223 | 10/1967 | Pacela | 128—2.1 |
| 3,433,217 | 3/1969 | Rieke | 128—2.1 |
| 3,220,404 | 11/1965 | Del Lucchese | 250—65 |

WALTER STOLWEIN, Primary Examiner

A. L. BIRCH, Assistant Examiner

U.S. Cl. X.R.

128—2; 250—93, 102